UNITED STATES PATENT OFFICE.

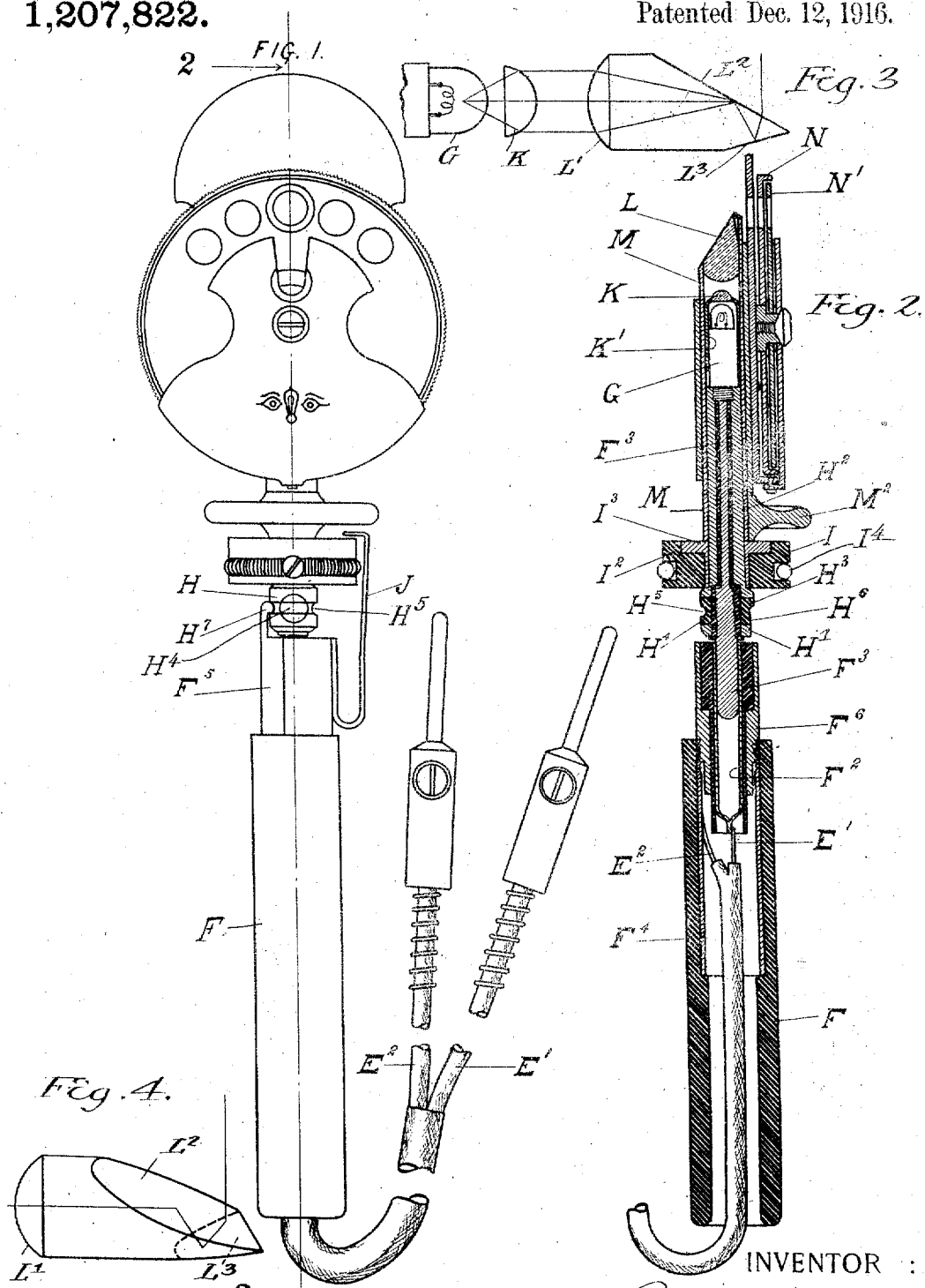

REINHOLD H. WAPPLER, OF NEW YORK, N. Y.

ELECTRIC OPHTHALMOSCOPE.

1,207,822.

Specification of Letters Patent.    Patented Dec. 12, 1916.

Application filed July 3, 1914. Serial No. 848,765.

*To all whom it may concern:*

Be it known that I, REINHOLD H. WAPPLER, a citizen of the United States of America, residing in borough of Manhattan, city, county, and State of New York, have invented certain new and useful Improvements in Electric Ophthalmoscopes, of which the following is a specification.

This invention relates to electric opthalmoscopes, and aims to provide certain improvements therein.

Electric opthalmoscopes, as heretofore constructed, have had certain disadvantages which have seriously interfered with their successful use. Such instruments usually comprise a handle which may include a suitable battery, a small electric lamp housed in the tube in line with the handle, and a mirror set at an angle of 45° to the axis of the handle and designed to reflect the rays of light from the lamp at a substantially 90° angle. Mounted back of the light tube and mirror are the usual series of lenses through which the operator observes the lens and interior of the eye for the purpose of determining lesions and refractory errors. In instruments of this construction the mirror is projected a considerable distance beyond the objective lenses, with the result that the eye of the operator cannot approach the eye to be examined a sufficiently close distance to permit a careful and accurate examination. Furthermore, in the endeavor to obtain satisfactory results it is not uncommon that the instrument is brought so close to the pupil of the eye as to injure the lens thereof. As the examination is conducted only by the vision of the operator, it will be apparent that only those rays of light which are reflected through the pupil of the patient's eye, the objective lens and the pupil of the operator are discernible to the latter. It may be said that these rays pass through an imaginary tube whose diameter is determined by the three factors just referred to. Obviously the nearer the eye of the operator can approach that of the patient the shorter this tube will be, and the more enlarged the field of vision. This is so small with the present instruments that it is usually necessary to dilate the pupil of the patient by the use of atropin, or other drugs.

According to the present invention the instrument is so constructed as to bring the eye of the operator as close as possible to that of the patient, and the parts are formed so that there are no projecting parts to injure the eye. By this means the field of vision of the operator is greatly enlarged, and the instrument is rendered safe to put in the hands of the inexperienced practitioner. It is not necessary in ordinary cases to dilate the pupil of the patient so that immediate examinations can be made without lengthy preparation.

The principal feature of improvement by which these results are attained is the provision of a prism mounted above the electric lamp, which prism is provided with a reflecting surface preferably formed directly upon the prism, and preferably having an angle to the vertical axis of the prism of about 10°. The front face of the prism preferably has an angle of about 35° from the vertical. These angles may be departed from, but in any event the prism is so formed that the beam of light is bent by the front face of the prism backwardly onto the reflecting surface, and thence outwardly through the front face of the prism at an angle which is approximately 90° to the vertical axis of the instrument.

The invention includes other improvements which will be hereinafter more fully described.

Referring to the drawings which illustrate the preferred form of the invention, Figure 1 is a front elevation of the apparatus, showing it equipped with a handle and flexible cord for connection with a battery at a distance. Fig. 2 is a vertical section taken on the line 2—2 in Fig. 1. Fig. 3 is a diagrammatic view of the lamp and prism. Fig. 4 is a diagrammatic view in perspective, showing the prism alone.

Referring to the drawings, let E' E² designate leads of any suitable length, adapted to be connected to socket terminals of a suitable source of electricity. The leads pass to a handle F formed of insulating material, and one of the wires, as E', is connected with a metallic tube F² which is electrically connected with one of the terminals of the lamp G through metallic rod F³, the lower portion of which fits removably into the tube as shown. The opposite lead E² is connected to a metallic sleeve F⁴, on which is screwed a sleeve F⁵, a portion of which F⁵ projects upwardly from the handle, and is designed to contact with the switch member H (Fig. 1). The latter comprises an enlargement H' formed on the end of the sleeve H² which passes upwardly and contacts with one of the terminals of the lamp G. The enlargement H' is provided with two insulating plugs H³ and H⁴, and the enlargement and plugs are each formed with a groove H⁵. This groove is, however, cut away at the part H⁶ of the plug H³, in order that the arm F⁵ may pass upwardly past the lower portion of the enlargement, so that its projecting portion H⁷ may reach the groove H⁵. It will be understood that the handle is separated from the ophthalmoscope proper by removal of the rod F³ from the tube F², and that the arm F⁵ acts as a mechanical detent to hold the parts together.

The lamp G which is of the ordinary incandescent type has preferably mounted above it a concentrating lens K which is best carried in a metallic tube K', and above the tube is mounted a prism L, preferably carried by a tube M which surrounds the lamp and other fittings hereinbefore described.

The prism L is best seen in the diagrammatic views, Figs. 3 and 4. The prism is generally cylindrical in form, the lower part being preferably convex as shown at L', so that a further concentration of the beam of light takes place at this point. On the front side of the prism it is formed with a flat face L² which extends at a suitable angle to the axis of the prism, that shown approximating 35°. At the top and rear of the prism is also formed a flat face L³ which preferably extends at an angle of about 10° to the axis of the prism. The rear face L³ is intended as a reflecting face, and to this end it is either directly silvered or is provided with a separately formed reflecting surface, such as a small mirror mounted at the rear of it and extending at the same angle. In Figs. 3 and 4 is shown diagrammatically the passage of a beam of light from the lamp G. The rays are condensed by the lens K, and further concentrated by the spherical face L' of the prism. The prism may be so constructed as to refract the beam slightly toward the flat face L², but in any event the beam is passed rearwardly to the reflecting surface L³, and bent slightly by the face L², so that as the beam emerges from the prism it follows a direction which is substantially 90° to the axis of the prism. One effect secured by the prism is that the actual reflecting face, which throws the beam of light forwardly at substantially an angle of 90° from the axis of the beam of light, is displaced well to the rear of such axis, so that it does not project from the instrument. In addition to this the flat face L² formed at the front of the prism is admirably adapted for approaching the pupil of the eye, so that the operator is able to bring the instrument much closer to the eye of the patient than is possible with existing instruments.

The usual disks N N' carrying the usual series of lenses may be mounted directly back of the prism, as best shown in Fig. 2, and the eye of the operator is hence able to approach very closely to the rear of the prism. The result of this construction is that the imaginary tube formed by the eye of the operator and the eye of the patient is greatly shortened, and the instrument hence permits a much wider field of observation than those now in use. As before stated, it is not necessary to dilate the pupil of the patient, since a thorough examination can be made with the pupil in its normal or contracted state.

It is quite desirable for certain purposes to vary the quality of the beam which the instrument projects, and this is done in the present device by lengthening the distance between the prism and the lamp G. To this end the tube M is mounted to slide upon the tube H², and to assist in adjusting it. A thumb-piece M² is provided at the lower end of the tube M by means of which the operator can easily move the prism tube (with the disks N N') to the required position.

While I have shown and described one form of the invention, it is understood that I do not wish to be limited thereto, since various changes may be made therein without departing from the spirit of the invention.

What I claim is:—

1. In an ophthalmoscope, the combination of a source of light, and a prism through which the light is projected, said prism having a substantially flat surface at its front extending at such an angle to the axis of the prism that the ray is totally reflected and a substantially flat surface at its rear also extending at an angle to the axis of the prism, and a reflecting medium at the last-named surface.

2. In an ophthalmoscope, the combination of a source of light, and a prism through which the light is projected, said prism having a substantially flat reflecting surface at its front extending at an angle to the axis of the prism and a substantially flat surface at its rear also extending at an angle to the axis of the prism, said second flat surface being coated with a reflecting medium.

3. In an ophthalmoscope, the combination of a source of light, and a prism through which the light is projected, said prism having a substantially flat reflecting surface at its front extending at an angle to the axis of the prism and a substantially flat surface at its rear also extending at an angle to the axis of the prism, said flat surface being coated with a reflecting medium, and said prism having a lentiform lower end.

4. In an ophthalmoscope, the combination of an electric lamp, a concentrating lens above the lamp, and a prism above the concentrating lens, said prism having a convex lower end, a substantially flat front reflecting surface and a substantially flat rear surface, both surfaces extending angularly to the axis of the prism, and the latter surface being provided with a reflecting medium.

5. In an ophthalmoscope, a source of light and means for deflecting a substantially vertical ray of light to a substantially horizontal direction, said means comprising a reflector for reflecting the vertical ray toward the rear of the ophthalmoscope and a reflector in the path of the reflected ray, adapted to reflect said ray forwardly, the two reflectors being so arranged that the sum of the angles of incidence and reflection of the vertical ray is considerably greater than the sum of the angles of incidence and reflection of the reflected ray, the ray passing through the device without crossing itself.

6. In an ophthalmoscope, a source of light and means for deflecting a substantially vertical ray of light to a substantially horizontal direction, said means comprising a reflector for reflecting the vertical ray toward the rear of the ophthalmoscope and a reflector in the path of the reflected ray, adapted to reflect said ray forwardly, the two reflectors being so arranged that the sum of the angles of incidence and reflection of the vertical ray is considerably greater than the sum of the angles of incidence and reflection of the reflected ray, the ray passing through the device without crossing itself, and a refractor adapted to bend the reflected ray to the desired direction.

7. In an ophthalmoscope, a source of light and means for deflecting a substantially vertical ray of light to a substantially horizontal direction, said means comprising a piece of light-transmitting substance having a reflecting surface for reflecting the vertical ray toward the rear of the ophthalmoscope and a reflecting surface in the path of the reflected ray adapted to reflect said ray forwardly, the two reflectors being so arranged that the sum of the angles of incidence and reflection of the vertical ray is considerably greater than the sum of the angles of incidence and reflection of the reflected ray, the ray passing through the device without crossing itself.

8. In an ophthalmoscope, a source of light and means for deflecting a substantially vertical ray of light to a substantially horizontal direction, said means comprising a piece of light-transmitting substance having a reflecting surface for reflecting the vertical ray toward the rear of the ophthalmoscope and a reflecting surface in the path of the reflected ray adapted to reflect said ray forwardly, the two reflectors being so arranged that the sum of the angles of incidence and reflection of the vertical ray is considerably greater than the sum of the angles of incidence and reflection of the reflected ray, the ray passing through the device without crossing itself, and a refracting surface adapted to bend the reflected ray to the desired direction.

In witness whereof, I have hereunto signed my name in the presence of two subscribing witnesses.

REINHOLD H. WAPPLER.

Witnesses:
 ALFRED LYSANDER,
 H. MARTIN KROSLER.